3,198,743
PREPARATION OF FERRIC OXIDE SOLS
Robert B. MacCallum, Fairfield, Conn., and Forrest R. Hurley, Ellicott City, Md., assignors to W. R. Grace & Co., New York, N.Y., a corporation of Connecticut
No Drawing. Filed June 19, 1962, Ser. No. 203,432
1 Claim. (Cl. 252—313)

This invention relates to new and useful improvements in the manufacture of ferric oxide sols. Especially, this invention relates to a process for making ferric oxide sols in which the particles comprising the sols are discrete and uniform in size and shape.

Uses for ferric oxide as produced in accordance with the instant invention include pigments for rubber, paints, paper, linoleum, and ceramics. The high-grade powder obtained from ferric oxide sols is used as a polishing agent for glass, precious metals, and diamonds. As well, it is used in the manufacture of magnetic materials such as ferrites and garnets.

The literature is replete with references to ferric oxide sol preparation in which a solution of a ferric salt is added slowly to boiling water. Most of these investigators chose to work in very dilute solutions (<1% $Fe_2O_3$) which have minimal commercial interest. It has been found that the particles formed by the prior art are not dense, discrete particles uniform in shape and size; in fact, the converse is true.

It is an object of this invention to prepare ferric oxide sols in which the particles are small, discrete, and uniform in size and shape.

This invention is based on the discovery that discrete dense particles, uniform in size and shape can be prepared at concentrations of 1% $Fe_2O_3$ and greater by refluxing a solution of ferric chloride and a base-releasing homogeneous precipitating agent.

Solutions of ferric salts tend to hydrolyze even in the cold to give hydrous ferric oxide and the corresponding strong acid, in accordance with the following reaction:

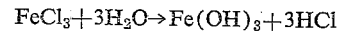

On aging, the hydrous ferric oxide loses water and crystallizes as $\alpha$-$Fe_2O_3$, hematite. Both aging and hydrolysis are accelerated by increased temperature. Therefore higher temperatures are needed for particle densification. But the concomitant effect of the temperature on the hydrolysis rate creates problems in controlling the rate of nucleation and particle growth, which is an essential factor in the preparation of good sol particles.

Since the rate of hydrolysis of ferric salts cannot be controlled in boiling (or hot) water (i.e., it proceeds briskly of its own accord without the addition of hydroxylions, removal of anions, or any of the other techniques used in the preparation of sols such as thoria and silica sols) control is obtained through slow addition of a cold solution of a ferric salt to boiling water.

While not wishing to be bound by theoretical explanation, it is believed that the strong acid released in the hydrolysis reaction is harmful to good particle formation; therefore, the inclusion of a homogeneous precipitating agent to control the acidity of the solution is beneficial to good particle formation. The following reaction is believed to take place:

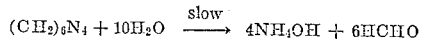

The base slowly released can then neutralize the HCl formed, thereby keeping acid concentration to a minimum.

The procedure for employing our invention is as follows:

A solution of a ferric salt is prepared. The $Fe_2O_3$ content of the solution can vary considerably from 0.1% $Fe_2O_3$ up to the saturation point; concentrations of less than 1% $Fe_2O_3$, however, are inconveniently dilute.

Also, an aqueous solution of hexamethylene tetramine is prepared. Again, the concentration is not critical, but it must be kept in mind that hexamethylene tetramine alone tends to form a very basic solution, and so the concentration of this additive must be adjusted in accordance with the ferric salt for optimum precipitation. We have found that roughly two equivalents of hexamethylene tetramine for each one equivalent of ferric salt gives satisfactory results.

The two solutions are then simultaneously and separately added to a quantity of boiling water under reflux. The ferric salt solution is kept at room temperature during addition to the boiling water. The $Fe_2O_3$ content of the suspension when addition is complete can be varied but probably should not exceed about about 10% $Fe_2O_3$. When the addition is complete the suspension is refluxed an additional period of time. This additional refluxing is not absolutely necessary but is beneficial to the particles. During addition and subsequent refluxing the suspension is stirred. The suspension is then allowed to cool to room temperature.

At this point the particles are heavily flocculated by the electrolyte and settle rapidly. After removal of the electrolyte, principally ammonium salt, the particles can be easily dispersed into a sol.

Removal of the electrolyte can be accomplished by many methods: (1) decanting the supernatant liquor after the particles have settled and replacing it with distilled water, (2) centrifuging and redispersing in distilled water, and (3) by passing the sol from the first method through a mixed ion-exchange resin bed. The volume of water in which the particles are redispersed may be varied in accordance with the $Fe_2O_3$ content desired in the final sol.

The following discussion pertains to the $Fe_2O_3$ particles after electrolyte removal. As long as the particles remain wet after they have been removed from suspension by centrifuging or other means, they are discrete and can be readily redispersed. If the particles are dried at room temperature a very fine-size powder results. A portion of the particles in this powder are loosely aggregated. This loose aggregation can be broken up by conventional techniques such as grinding after which the original discrete particles are obtained.

The particles produced by the above methods are single, rhomb-shaped crystals in the 25 m$\mu$ size range.

The general procedure for the use of a homogeneous precipitation agent as set forth above is described in the following example.

*Example I*

708 gms. of $Fe(NO_3)_3 \cdot 9H_2O$ were dissolved in water and made up to 2 liters with water. 184 gms. of hexamethylenetetramine were dissolved in water and made up to one liter with water. These two solutions were pumped separately into 12 liters of boiling water under reflux at the rate of 8 and 4 mls./minute, respectively. The resuling sol was stirred constantly. After 3 hours, addition of the ferric nitrate and $(CH_2)_6N_4$ soltuions was stopped. The sol was allowed to reflux an additional 15 minutes before being allowed to cool to room temperature. A portion of the sol was centrifuged and the supernatant liquor was discarded. The particles were redispersed in distilled water and an electron micrograph taken. The average particle size was about 25 m$\mu$. The predominant form of the $Fe_2O_3$ was single, rhomb-shaped crystals, although spherical aggregates of small crystallities were present.

The following example is given for the purpose of comparing the results of our method with those of a standard method in the prior art in which no homogeneous precipitating agent is used.

Example II 19.3 gms. of FeCl$_3$.6H$_2$O were dissolved in water and made up to 80 mls. This solution was added dropwise to 320 ml. of boiling water under reflux over a four-hour period. After the addition was complete the suspension was refluxed an additional two hours, after which it was allowed to cool to room temperature. The total Fe$_2$O$_3$ concentration was 1.4%. A portion of the suspension was centrifuged. The supernatant liquor was discarded. The particles thrown down were redispersed in water and an electron micrograph taken. The micrograph showed nodular particles varying widely in shape, size, and particle density. The gross particles are loose aggregates of smaller particles. The gross particles vary greatly in size, the smallest being about 150 m$\mu$ and the largest being in the 500 m$\mu$ size range.

We claim:

A method of producing a ferric oxide sol characterized by a suspension of discrete ferric oxide particles having a uniform size of about 25 millimicrons comprising preparing an aqueous solution of a ferric salt, preparing an aqueous solution of hexamethylene tetramine in sufficient quantity to react with the acid formed as a result of the hydrolysis of said ferric salt, adding both of said solutions to boiling water and refluxing the mixture for sufficient time to induce good ferric oxide particle formation.

References Cited by the Examiner
UNITED STATES PATENTS

| 2,335,760 | 11/43 | Hucks | 23—200 |
| 2,426,020 | 8/47 | Hauck | 252—313 XR |
| 2,935,379 | 5/60 | Martin | 23—200 |

OTHER REFERENCES

Weiser: Inorganic Colloid Chemistry, vol. II, The Hydrous Oxides and Hydroxides, Wiley & Sons, Inc., New York (1935), pages 46, 47, 49, and 50.

JULIUS GREENWALD, Primary Examiner.

ALBERT T. MEYERS, Examiner.